March 26, 1940.   A. MODRAY   2,195,318

PROTECTIVE EDGE MOLDING AND SUPPORT

Filed March 3, 1939

INVENTOR

ANTON MODRAY

BY H. M. Plaisted,

ATTORNEY

Patented Mar. 26, 1940

2,195,318

UNITED STATES PATENT OFFICE 2,195,318

PROTECTIVE EDGE MOLDING AND SUPPORT

Anton Modray, Webster Groves, Mo.

Application March 3, 1939, Serial No. 259,574

3 Claims. (Cl. 311—107)

This invention relates to certain new and useful improvements in protective edge molding and support, the peculiarities of which will be hereinafter fully described and claimed.

More particularly my invention has reference to angle strips of metal or other suitable material adapted to be applied to the edge and adjacent face portion of a desk or the like and to be secured thereto by hidden fastening means passing through holes previously made at intervals through the desk near its edge, said fastening means being slidingly engaged with the molding strip so as to be readily adjusted at the intervals in the series of holes in the desk and then clamp the molding thereto.

With this and other objects in view, my invention has reference to means for supporting the fastening bolt in an adjustable piece slidingly engaged with the molding strip to facilitate locating said means in the holes previously formed in the desk; second, for means concealed in said molding for so mounting the fastening means proper; third, for holding in firmly clamped position the edge flange and adjacent face flange of the molding strip; fourth, for providing the outer edge of the face flange with a special form of construction adapted for engagement by the slidingly mounted fastening means; fifth, for adaptingly mounted fastening means; fifth, for adapting the opposite edge of the molded strip for similar sliding engagement with the fastening means in order firmly to clamp said edge in located position on the desk or the like; sixth, for supporting the angle corner of said strip firmly in more or less raised position above the plane of the desk while at the same time securing the outer edges of the angle strip firmly in desired position; seventh, for a special construction of the slidingly mounted part of the fastening means to effect said clamping and supporting function; eighth, for maintaining the firmly clamped condition of a miter joint of said molding by such concealed fastening means; and for other objects and details of construction hereinafter described and claimed.

Figure 1:
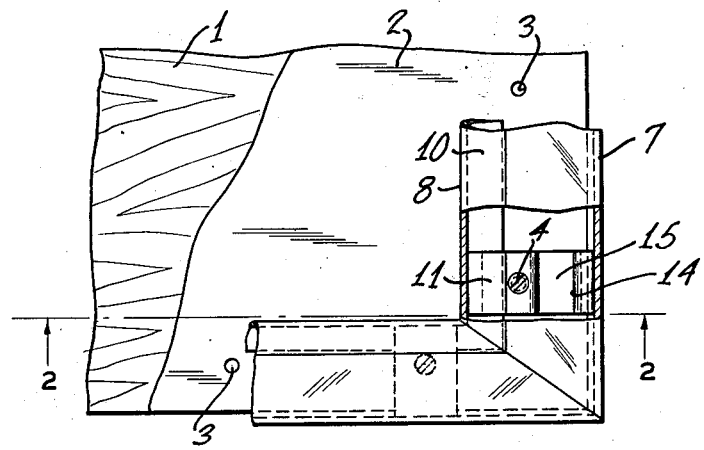
Figure 2:
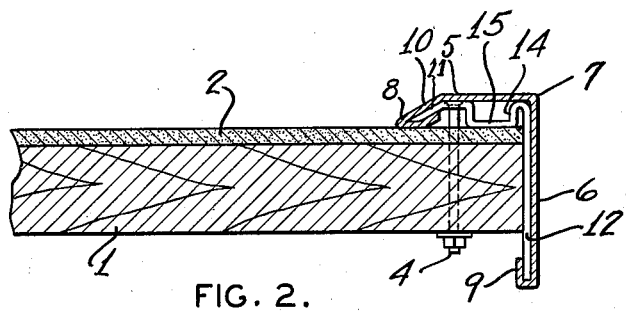
Figure 3:
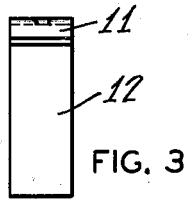
Figure 4:
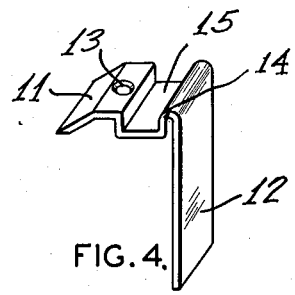

In the accompanying drawing in which like reference numerals indicate corresponding parts, Fig. 1 represents a plan view of a corner portion of a desk or the like having my molding applied thereto and a portion broken away to show the fastening means adjacent the corner;

Fig. 2, a vertical sectional view on the line 2—2 of Fig. 1 showing my device applied to a desk or the like and a covering pad on the desk or the like;

Fig. 3, a detail side view of a slidable clip for engagement with a bolt and forming the main portion of the fastening means; and Fig. 4, a perspective view of said clip showing its preferred construction.

Referring to the drawing, the numeral 1 designates a portion of a desk or the like having a pad 2 of linoleum or other suitable material on its upper surface. A series of holes 3 are formed at intervals near the edge of said desk or the like to receive corresponding bolts 4 for attachment of the molding to the desk or the like.

The main portion of my fastening means consists of a clip to be engaged by the bolt and consisting of a piece corresponding to the angle molding and adapted to be slidingly mounted in concealed position in the molding and be adjusted in proper position to allow the bolt to be placed in the desired hole of the desk and secured therein and thereby clamp the molding thereto.

My molding consists of flanges 5 and 6 meeting at a corner 7 and adapted to be applied respectively to the face portion and edge portion of the desk as shown in the figures; the flange 5 has its outer edge extending under the flange more or less to form a hook 8. The outer edge of the flange 6 has a similar hook portion 9. The face flange is preferably beveled at 10 to make the flange more nearly correspond to the upper face of the desk or the pad 2 that is engaged by the inner edge 8 as shown in Fig. 2.

The molding is preferably formed by bending up sheet metal such as stainless steel in a continuous strip that is cut into suitable length for the application to desks or the like. I support the bolt 4 by a clip having legs corresponding to the flanges 5 and 6 so that the outer end 11 of the upper leg and the outer end of the depending leg 12 slidingly engage the corresponding hooks 8 and 9 of the respective flanges 5 and 6 of the angle strip forming the molding. The said clip has a hole 13, or is otherwise adapted to be engaged by the upper end of the bolt 4 which is secured by the usual washer and nut at its lower end as shown in Fig. 2. The location of this hole 13 is midway between the outer end of the upper leg of the clip and the inner end which is integrally connected with the depending leg 12 by an upstanding fold 14 one layer of which extends downward to a horizontal plate portion 15 that is adapted to bear upon the upper face of the desk or the pad, and thus serve as a post to support the corner 7 of the molding.

The depending leg 12 of the clip holds down the corner 7 of the molding by the engagement of its lower end with the hook 9 of the edge flange of the molding. Thus while the bolt clamps the outer edge of the leg that engages the hook 8 closely against the face of the desk or superposed pad, the depending leg 12 exerts a similar downward pressure upon the hook 9 and transfers to the corner of the flanges forming the molding strip.

The flange 6 of the molding is shown in Fig. 2 extending downward beyond the lower surface of the desk 1, but may be of lesser length vertically according to the desired protection or the appearance of the edge of the desk or the like.

The outer end of the upper leg of the clip is preferably beveled to correspond with the hook 8 and raises the adjacent portion of the leg somewhat above the horizontal plate portion 15 so that the downward tension of the bolt will be exerted on the plate portion and also the outer beveled edge portion of said leg. A percentage of this downward pull of the bolt is transferred to the post 14 and the engagement of the depending leg of the clip with the hook 9 prevents any tendency of the corner 7 of the molding to rise. Thus the molding is firmly held to the desk or the like by engagement of the slidable clip which is adjusted in its engagement with the molding according to the hole 3 in which it is located.

Thus a series of these clips with their accompanying bolts can be adjusted at intervals in their concealed position below the face flange to facilitate the entrance of the bolts through the holes in the desk and thus clamp the molding at suitable intervals firmly in position with regard to the outer edges of the flanges and meeting corner 7. Referring to Fig. 1, the miter in the molding is formed by cutting out the face flange at a suitable angle while leaving the leg flange intact and then bending it until the angle edges meet as shown in Fig. 1. By the use of my clips, I secure these meeting angle edges of the miter in position firmly without the use of solder by locating two of the described clips closely adjacent the meeting edges of the molding as shown in Fig. 1. This promotes the appearance of the molding at the corner of the desk and lessens labor expense of mounting it thereon.

Thus it will be seen by my construction above described I provide for holding the molding strip in position at the edge of a desk or the like and clamp the pad to the upper face of the desk when such is used, or promote the appearance of the desk by the ornamental appearance of the stainless metal molding applied thereto. When applied to the edge of a sink for instance the more or less raised shape of the face flange from its beveled edge, obstructs water that would otherwise splash over the molding, yet allows cleaning the face of the sink by the beveled edge shape.

While I have fully described my preferred construction as above, I do not limit myself to the exact form of the same except by the appended claims:

I claim:

1. A protective molding and support comprising flanges meeting at a corner and forming an angle strip, one flange being beveled and having an inward hook portion at its edge, and the other flange depending from the angle corner and having a similar inward hook portion, in combination with fastening means comprising a clip having legs meeting at a folded corner portion adapted to support the adjacent corner of the molding, and engage the hook ends of the molding flanges, substantially as described.

2. A protective molding and support consisting of vertical flanges one bent integrally downward at right angles to another horizontal flange that is cut angularly to form meeting edges at a corner where the vertical flange is bent at right angles, the outer edges of each flange having inturned hook portions positioned respectively adjacent the face portions and edge of a desk or the like, in combination with a pair of bolts passing vertically through said desk or the like adjacent the desk corner and through clips positioned adjacent said corner and each clip having a depending leg and an upper horizontally disposed leg integrally connected with the depending leg by an upstanding fold one layer of which extends downward to a horizontal plate portion adapted to bear upon the upper face of the desk or the like and serve as a post for the superposed corner of the molding strip, the outer end of the upper leg being inclined in a bevel, engaging the inturned hook edge of the outer flange of the molding strip to raise the adjacent portion of the clip above said bearing portion of the clip so that the downward tension of the bolt engaging said leg between the post and outer end of the leg will be exerted on the horizontal bearing plate portion and also on the outer end of the clip engaging the inturned hook of the molding flange.

3. The combination with a desk having a pad thereon and a series of holes near its edge, of a protective molding and support comprising an angle strip of sheet metal bent into vertical and horizontally disposed flanges meeting in a corner, said flanges having inward hook portions at outer edges, and a series of fastening means for said strip each comprising a clip having vertical and horizontally disposed legs integrally connected by an upstanding fold of two layers forming a post, one layer having a bearing portion on said pad below said molding corner, the outer ends of said clip and said post engaging respectively the outer hook portions of molding and the meeting corner of said molding, and a bolt passing through a selected vertical hole of the desk and engaging the horizontal leg of the clip between said post and the end of the clip that engages the outer inturned hook end to hold the adjacent end of the molding down on the pad and to hold the corner of the molding in position supported by said post.

ANTON MODRAY.